(12) United States Patent
Yang

(10) Patent No.: US 9,389,497 B2
(45) Date of Patent: Jul. 12, 2016

(54) MICRO-PROJECTION-DISPLAY DEVICES AND ADJUSTABLE DISPLAY SCREENS

(71) Applicant: Tencent Technology (Shenzhen) Company Limited, Shenzhen (CN)

(72) Inventor: Jianbei Yang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/454,192

(22) Filed: Aug. 7, 2014

(65) Prior Publication Data

US 2015/0022886 A1    Jan. 22, 2015

Related U.S. Application Data

(63) Continuation of application No. PCT/CN2014/079054, filed on Jun. 3, 2014.

(30) Foreign Application Priority Data

Jul. 18, 2013  (CN) .......................... 2013 1 0302854

(51) Int. Cl.
*G03B 21/30* (2006.01)
*G03B 21/58* (2014.01)
*G03B 21/10* (2006.01)
(Continued)

(52) U.S. Cl.
CPC ............. *G03B 21/58* (2013.01); *G03B 21/10* (2013.01); *G03B 21/30* (2013.01); *H04M 1/0272* (2013.01); *H04N 9/3173* (2013.01)

(58) Field of Classification Search
CPC ........ G03B 21/56; G03B 21/58; G03B 29/00; G03B 21/30; G03B 21/10; H04N 9/3173

USPC ............. 359/448, 443; 353/79; 160/328, 329, 160/378
See application file for complete search history.

(56) References Cited

U.S. PATENT DOCUMENTS 4,406,519 A * 9/1983 Shaw ............................. 359/443
5,148,283 A * 9/1992 Taddeo ......................... 348/832
(Continued)

FOREIGN PATENT DOCUMENTS

CN    1755517 A    4/2006
CN  101387821 A    3/2009
(Continued)

OTHER PUBLICATIONS

Chinese Patent Office, Office Action mailed Feb. 10, 2015, in Application No. 201310302854.0.
(Continued)

*Primary Examiner* — Christopher Mahoney
(74) *Attorney, Agent, or Firm* — Jones Day

(57) ABSTRACT

An example micro-projection-display device includes: a projection lens, an elastic projection screen, a stretchable projection framework and a sliding block. At least one point of the stretchable projection framework is connected with the elastic projection screen, so that the stretchable projection framework is configured to control the elastic projection screen to stretch or retract. The sliding block is connected with the stretchable projection framework. The sliding block is configured to cause the stretchable projection framework to stretch or retract, so as to cause the elastic projection screen to stretch or retract. The projection lens is configured to project light onto the stretched elastic projection screen.

18 Claims, 15 Drawing Sheets

(51) Int. Cl.
*H04N 9/31* (2006.01)
*H04M 1/02* (2006.01)

(56) References Cited

U.S. PATENT DOCUMENTS

| | | | |
|---|---|---|---|
| 6,069,097 A | 5/2000 | Suzuki et al. | |
| 6,083,583 A | 7/2000 | Klocek et al. | |
| 6,249,377 B1 | 6/2001 | Takamoto et al. | |
| 7,180,665 B2 | 2/2007 | Daniel et al. | |
| 7,324,277 B2* | 1/2008 | Choi | 359/452 |
| 7,397,603 B2* | 7/2008 | Peterson et al. | 359/443 |
| 7,623,290 B2 | 11/2009 | Liang et al. | |
| 7,872,802 B2* | 1/2011 | Seymour | 359/461 |
| 7,894,132 B2* | 2/2011 | Yoshino et al. | 359/443 |
| 7,933,068 B2* | 4/2011 | Peterson et al. | 359/443 |
| 8,320,112 B2* | 11/2012 | Gong et al. | 361/679.26 |
| 8,358,464 B1* | 1/2013 | Risher | 359/443 |
| 2003/0020885 A1 | 1/2003 | Suzuki | |
| 2006/0017887 A1 | 1/2006 | Jacobson et al. | |
| 2006/0077356 A1* | 4/2006 | Merczak | 353/79 |
| 2006/0234784 A1 | 10/2006 | Reinhorn | |
| 2006/0256144 A1* | 11/2006 | Chung | 345/905 |
| 2007/0086088 A1* | 4/2007 | Astill | 359/443 |
| 2007/0091278 A1 | 4/2007 | Zakoji et al. | |
| 2008/0163991 A1 | 7/2008 | Dettbarn et al. | |
| 2009/0067045 A1 | 3/2009 | Yoshino et al. | |
| 2009/0109531 A1* | 4/2009 | Zhu et al. | 359/461 |
| 2010/0007950 A1* | 1/2010 | Yuzawa | 359/461 |
| 2010/0321642 A1* | 12/2010 | Templier et al. | 353/66 |
| 2011/0199678 A1* | 8/2011 | Kuroi | 359/461 |
| 2014/0063600 A1* | 3/2014 | Sharp et al. | 359/446 |
| 2014/0355110 A1* | 12/2014 | Farmer et al. | 359/443 |

FOREIGN PATENT DOCUMENTS

| | | |
|---|---|---|
| CN | 101419389 A | 4/2009 |
| CN | 201327562 Y | 10/2009 |
| CN | 101625517 A | 1/2010 |
| CN | 101930159 A | 12/2010 |
| CN | 201853059 U | 6/2011 |
| JP | 2006317697 A | 11/2006 |
| JP | 2011128510 A | 6/2011 |
| WO | WO 2010/139373 A1 | 12/2010 |

OTHER PUBLICATIONS

Patent Cooperation Treaty, International Search Report mailed Sep. 24, 2014, in International Application No. PCT/CN2014/079054.
China Patent Office, Office Action issued Apr. 28, 2015, in Application No. 201310302854.0

* cited by examiner

MICRO-PROJECTION-DISPLAY DEVICES AND ADJUSTABLE DISPLAY SCREENS

CROSS-REFERENCES TO RELATED APPLICATIONS

This application is a continuation of International Application No. PCT/CN2014/079054, with an international filing date of Jun. 3, 2014, now pending, which claims priority to Chinese Patent Application No. 201310302854.0, filed Jul. 18, 2013, both applications being incorporated by reference herein for all purposes.

BACKGROUND OF THE INVENTION

Certain embodiments of the present invention are directed to display technology. More particularly, some embodiments of the invention provide display devices and display screens. Merely by way of example, some embodiments of the invention have been applied to micro-projection-display devices and adjustable display screens. But it would be recognized that the invention has a much broader range of applicability.

Many manufacturers integrate projection technology on mobile phones to manufacture micro-projection mobile phones which not only have their own screens for displaying mobile phone content, but also can project high-definition pictures up to 50 inches in size. But a micro-projection mobile phone is often a direct combination of a micro-projector and a mobile phone with functions of a usual mobile phone and functions of an ordinary micro-projector (e.g., projecting to a 20-inch screen or to a 50-inch screen). The micro-projection mobile phone that is equipped with both a display screen and a micro-projector is often used only for watching big-screen movies in an office setting or at home, and has limited utility.

At present, another type of adjustable-screen mobile phone uses two display screens, where a smaller display screen is used primarily for mobile phone functions (e.g., taking phone calls), and a larger display screen is for use similar to IPad. As such, the adjustable screen is achieved using essentially two screens and two devices. However, the conventional adjustable-screen mobile phone is not easy to carry around, and has only two fixed-size screens with limited flexibility.

Hence it is highly desirable to improve the techniques for display devices and display screens.

BRIEF SUMMARY OF THE INVENTION

According to one embodiment, a micro-projection-display device includes: a projection lens, an elastic projection screen, a stretchable projection framework and a sliding block. At least one point of the stretchable projection framework is connected with the elastic projection screen, so that the stretchable projection framework is configured to control the elastic projection screen to stretch or retract. The sliding block is connected with the stretchable projection framework. The sliding block is configured to cause the stretchable projection framework to stretch or retract, so as to cause the elastic projection screen to stretch or retract. The projection lens is configured to project light onto the stretched elastic projection screen.

According to another embodiment, an adjustable display screen includes: an elastic projection screen, a stretchable projection framework, and a sliding block. At least one point of the stretchable projection framework is connected with the elastic projection screen, so that the stretchable projection framework is configured to control the elastic projection screen to stretch or retract. The sliding block is connected with the stretchable projection framework. The sliding block is configured to cause the stretchable projection framework to stretch or retract, so as to cause the elastic projection screen to stretch or retract.

For example, the devices and screens described herein are configured to provide a micro-projection-display device of which a size of a display screen can be flexibly adjusted to improve the utility of the micro-projection-display device and further provide an adjustable display screen.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
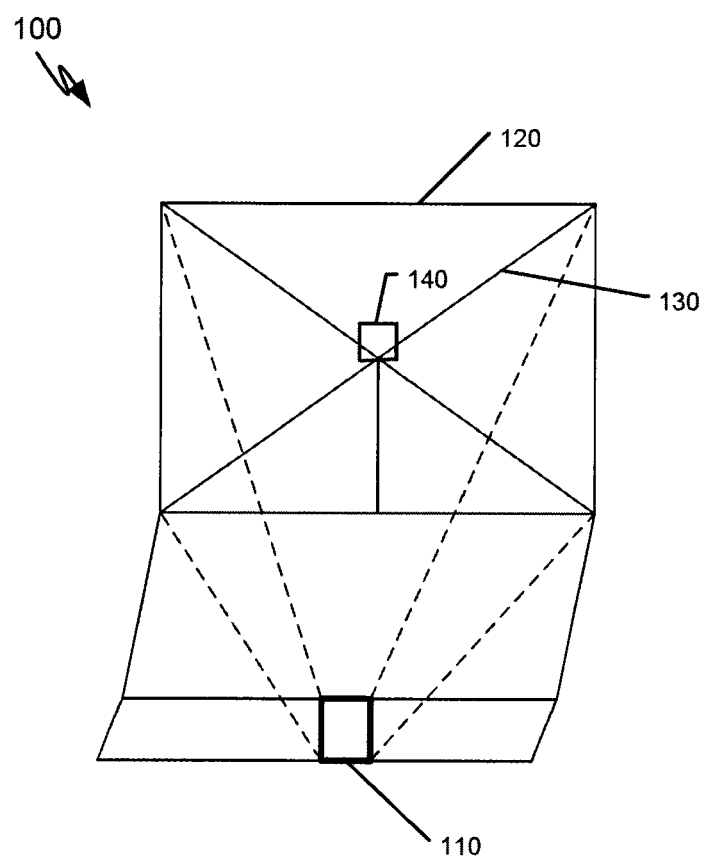
FIG. 1 is a simplified diagram showing a micro-projection-display device according to one embodiment of the present invention.

FIG. 1 is a simplified diagram showing a micro-projection-display device according to one embodiment of the present invention. The diagram is merely an example, which should not unduly limit the scope of the claims. One of ordinary skill in the art would recognize many variations, alternatives, and modifications. The micro-projection-display device 100 includes a projection lens 110, an elastic projection screen 120, a stretchable projection framework 130 and a sliding block 140.

According to one embodiment, at least one point of the stretchable projection framework 130 is connected with the elastic projection screen 120, so that the stretchable projection framework 130 affects (e.g., controls) stretching and retraction of the elastic projection screen 120. For example, the sliding block 140 is connected with the stretchable projection framework 130 and moves to drive the stretchable projection framework 130 to stretch or retract so as to enable the elastic projection screen 120 to stretch or retract. As an example, the projection lens 110 projects onto the expanded elastic projection screen 120.

Figure 2:
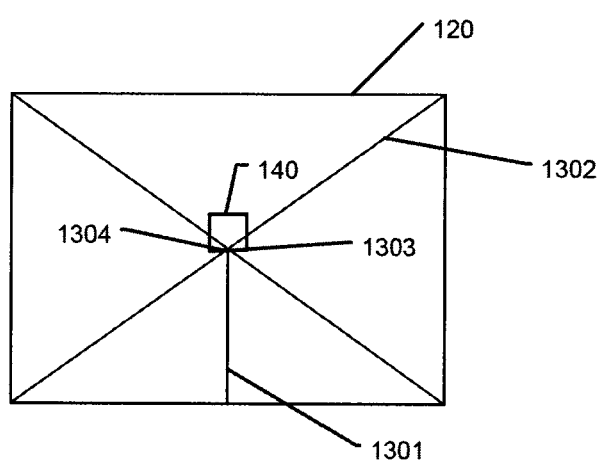
FIG. 2 is a simplified diagram showing a projection frame work as part of the micro-projection-display device as shown in FIG. 1 according to one embodiment of the present invention.

FIG. 2 is a simplified diagram showing the projection frame work 130 as part of the micro-projection-display device 100 according to one embodiment of the present invention. The diagram is merely an example, which should not unduly limit the scope of the claims. One of ordinary skill in the art would recognize many variations, alternatives, and modifications. The projection framework 130 includes a stretchable support rod 1301 and a stretchable centrosymmetric support 1302.

According to one embodiment, a vertex 1303 of the support rod 1301 is connected with a central point 1304 of the centrosymmetric support 1302. For example, the sliding block 140 is connected on stretchable support rod 1301. As an example, the sliding block 140 moves to drive the support rod 1301 to stretch or retract so as to drive the support 1302 to stretch or retract. As shown in FIG. 2, the support 1302 is an X-shaped support, in some embodiments. In certain embodiments, the support 1302 is a snowflake-shaped support. For example, the stretchable support rod 1301 and/or the stretchable support 1302 have a nested structure that includes multilayered tubes, where an outmost tube is the thickest and inner tubes are thinner.

Figure 3:
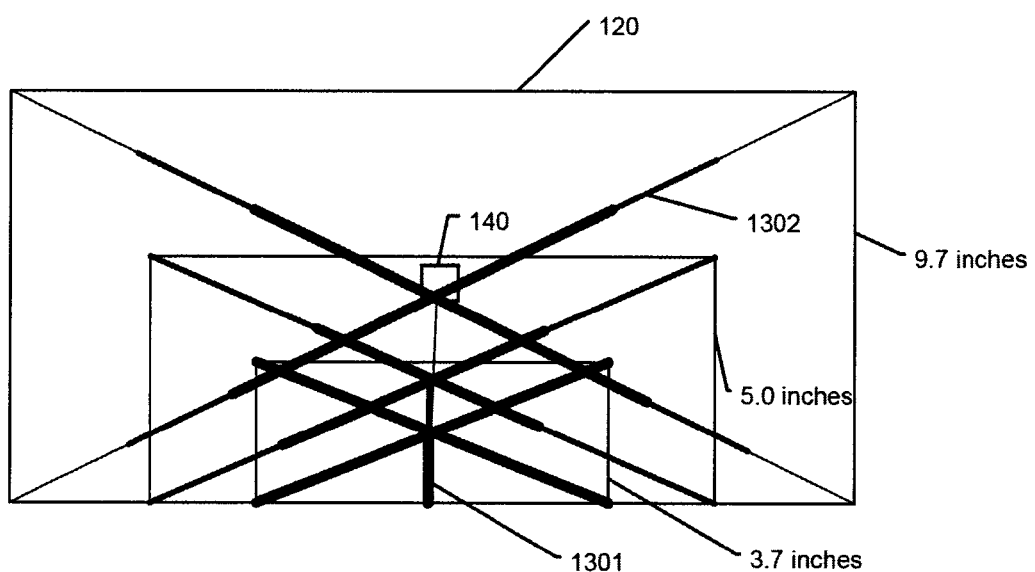
FIG. 3 is a simplified diagram showing the projection frame work as shown in FIG. 2 that stretches or retracts according to one embodiment of the present invention.

FIG. 3 is a simplified diagram showing the projection frame work 130 that stretches or retracts according to one embodiment of the present invention. The diagram is merely an example, which should not unduly limit the scope of the claims. One of ordinary skill in the art would recognize many variations, alternatives, and modifications.

As shown in FIG. 3, initially, the elastic projection screen 120 corresponds to a 3.7-inch projection screen, in some embodiments. For example, if the sliding block 140 is moved upward, the support rod 1301 stretches upward. As the vertex of the support rod 1301 is connected with the central point of the support 1302, the upward stretching of support rod 1301 causes the four sides of the support 1302 to stretch and in turn causes the elastic projection screen 120 to expand. As an example, if the support rod 1301 is held (e.g., fixed) at a 5.0-inch position, the support 1302 does not stretch and the elastic projection screen 120 is expanded to a size of 5.0 inches. For example, when the sliding block 140 continues to slide upward, the support rod 1301 also stretches further upward and the support 1302 is also further stretched. When the support rod 1301 is held (e.g., fixed) at a 9.7-inch position, the support 1302 does not stretch and the elastic projection screen 120 is expanded to a size of 9.7 inches.

As discussed above, and further emphasized here, FIG. 3 is merely an example, which should not unduly limit the scope of the claims. One of ordinary skill in the art would recognize many variations, alternatives, and modifications. For example, the elastic projection screen 120 can be expanded to various different sizes.

Figure 4:
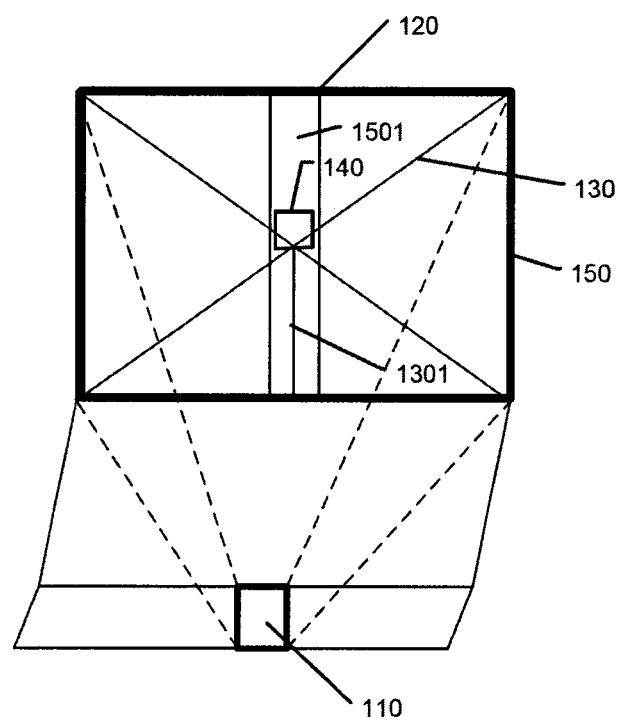
FIG. 4 is a simplified diagram showing a micro-projection-display device according to another embodiment of the present invention.

FIG. 4 is a simplified diagram showing a micro-projection-display device according to another embodiment of the present invention. The diagram is merely an example, which should not unduly limit the scope of the claims. One of ordinary skill in the art would recognize many variations, alternatives, and modifications. The micro-projection-display device 100 further includes a housing cover 150.

According to one embodiment, a central part of one side of the elastic projection screen 120 is attached (e.g., fixed) at one end of the housing cover 150. For example, the affixed portion of the elastic projection screen 120 can be on a bottom side, a top side, a left side or a right side of the elastic projection screen 120. As an example, a sliding groove 1501 is disposed on the housing cover 150. The support rod 1301 is disposed in the sliding groove 1501. The sliding block 140 slides inside the sliding groove 1501. In one example, the sliding block 140 is disposed on the outer side of the housing cover 150. When the size of the elastic projection screen 120 needs to be adjusted, a user can move the sliding block 140 manually, and the movement of the sliding block 140 causes the elastic projection screen 120 to expand, in some embodiments.

Figure 5:
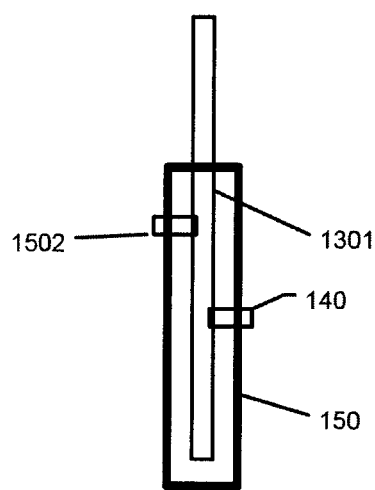
FIG. 5 is a simplified diagram showing a side view of a housing cover as part of the micro-projection-display device as shown in FIG. 1 according to one embodiment of the present invention.

FIG. 5 is a simplified diagram showing a side view of the housing cover 150 as part of the micro-projection-display device 100 according to one embodiment of the present invention. The diagram is merely an example, which should not unduly limit the scope of the claims. One of ordinary skill in the art would recognize many variations, alternatives, and modifications. According to one embodiment, a fixing block 1502 is disposed inside the sliding groove of the housing cover 150, and is used for holding (e.g., fixing) the support rod 1301 in place after the support rod 1301 is moved. For example, the fixing block 1502 includes a clamp, a fixing buckle or a fixing ring.

Figure 6:
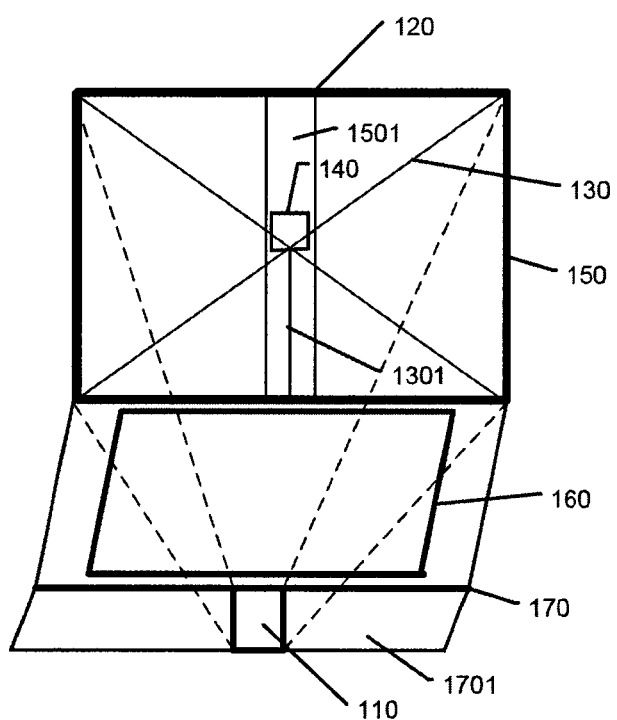
FIG. 6 is a simplified diagram showing a micro-projection-display device according to yet another embodiment of the present invention.
Figure 7A:
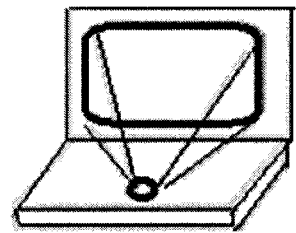
FIG. 7A-FIG. 7D are simplified diagrams showing micro-projection-display devices according to some embodiments of the present invention.
Figure 7B:
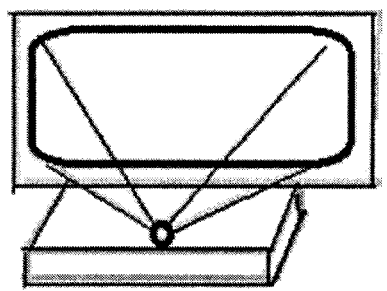
Figure 7C:
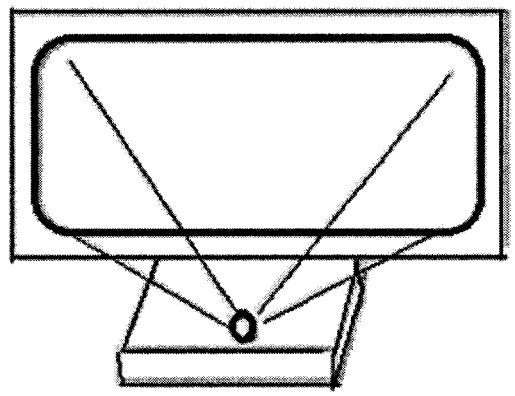
Figure 7D:
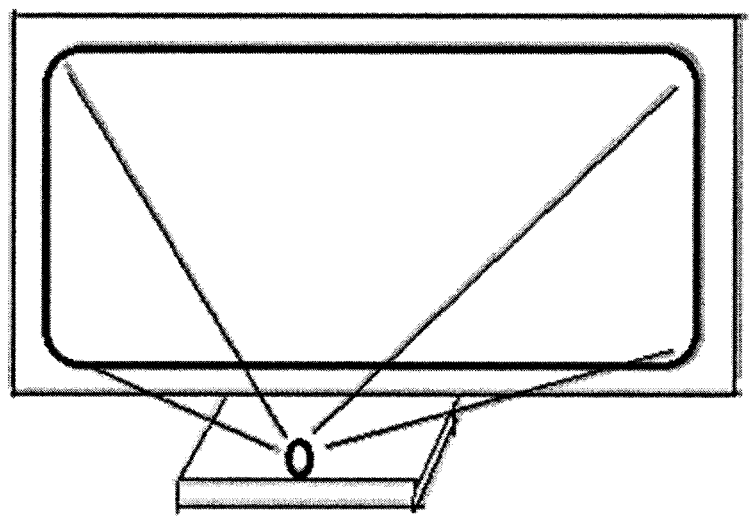

FIG. 6 is a simplified diagram showing a micro-projection-display device according to yet another embodiment of the present invention. The diagram is merely an example, which should not unduly limit the scope of the claims. One of ordinary skill in the art would recognize many variations, alternatives, and modifications.

According to one embodiment, the projection lens 110 includes a short-focus lens with a projection distance of about 5-15 cm. For example, the micro-projection-display device 100 further includes another glass screen 160 and an electronic body 170. In another example, when the micro-projection-display device 100 includes a mobile phone, the glass screen 160 is used for displaying incoming calls. When a user wants to watch movies or play games, the user can open the housing cover 150, and move the sliding block 140 to expand the elastic projection screen 120 to a required size for projection. As an example, the housing cover 150 is installed on the electronic body 170, and can be turned up or slid to open. As another example, a housing groove 1701 is disposed on the electronic body 170. When the projection lens 110 is not in use, the projection lens 110 is hidden in the housing groove 1701. For example, the housing cover 150 (or another housing cover) can be disposed on the housing groove 1701 so as to protect the lens from dirt. When the projection lens 110 is in use, the housing cover 150 can be opened so that the projection lens pops up for projection.

FIG. 7A-FIG. 7D are simplified diagrams showing micro-projection-display devices according to some embodiments of the present invention. The diagrams are merely examples, which should not unduly limit the scope of the claims. One of ordinary skill in the art would recognize many variations, alternatives, and modifications.

Micro-projection-display devices with sizes of 3.5, 5.0, 7.9 and 9.7 inches are shown in FIG. 7A, FIG. 7B, FIG. 7C and FIG. 7D, respectively, according to some embodiments. For example, elastic projection screens of the micro-projectiondisplay devices are made of rubber, latex or other deformable (or stretchable) materials. In another example, stretchable supports are used to realize the screens of different sizes. Using the characteristics of the projection lens (e.g., close-up focus, close-up projection), the mobile phone is adapted for different entertainment needs, such as games and movies, through changing the size of the screen to overcome the inconvenience of using a giant-screen mobile phone or a tablet computer and achieve effects of a giant-screen mobile phone or a tablet computer on the mobile phone.

The conventional mobile phones are designed within a certain range of size to achieve portability. A mobile phone with a 5.0-inch screen may be too large to be carried around conveniently. Tablet computers with large screens improve user experience. But tablet computers often cannot be carried around easily due to large volumes, and are not inconvenient for watching movies or playing games since the tablet computers usually need to be held in hand for use.

According to some embodiments, the micro-projection-display device and the adjustable display screen can be configured to achieve screen change. For example, the micro-projection-display device can not only perform functions of mobile phones, but also change the screen for watching movies or playing games. In some embodiments, a mobile phone including the micro-projection-display device has a screen size of 3.7 inches, and can be carried out conveniently. In addition, due to screen-change capability, the mobile phone is powerful and practical. In certain embodiments, the mobile phone mainly uses the micro-projection-display device for displaying high-definition pictures, and is separated from the changeable screen. For example, the mobile phone can use a supporting screen which can be moved around for better experience for movies or entertainment.

Figure 8:
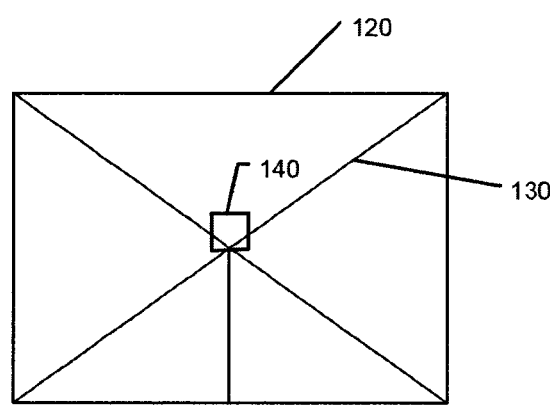
FIG. 8 is a simplified diagram showing an adjustable display screen according to one embodiment of the present invention.

FIG. 8 is a simplified diagram showing an adjustable display screen according to one embodiment of the present invention. The diagram is merely an example, which should not unduly limit the scope of the claims. One of ordinary skill in the art would recognize many variations, alternatives, and modifications. The adjustable display screen 200 includes an elastic projection screen 120, a stretchable projection framework 130 and a sliding block 140.

According to one embodiment, at least one point of the stretchable projection framework 130 is connected with the elastic projection screen 120, so that the stretchable projection framework 130 affects (e.g., controls) the stretching and retraction of the elastic projection screen 120. For example, the sliding block 140 is connected with the stretchable projection framework 130 and moves to drive the stretchable projection framework 130 to stretch or retract so as to enable the elastic projection screen 120 to stretch or retract.

Figure 9:
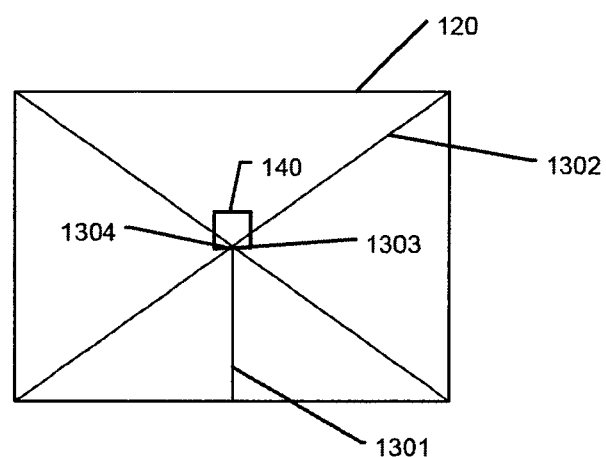
FIG. 9 is a simplified diagram showing a projection framework as part of the adjustable display screen as shown in FIG. 8 according to one embodiment of the present invention.

FIG. 9 is a simplified diagram showing the projection framework 130 as part of the adjustable display screen 200 according to one embodiment of the present invention. The diagram is merely an example, which should not unduly limit the scope of the claims. One of ordinary skill in the art would recognize many variations, alternatives, and modifications. The projection framework 130 includes a stretchable support rod 1301 and a stretchable centrosymmetric support 1302.

According to one embodiment, the vertex 1303 of the support rod 1301 is connected with a central point 1304 of the centrosymmetric support 1302. For example, the sliding block 140 is connected on stretchable support rod 1301 and moves to drive the support rod 1301 to stretch or retract so as to drive the support 1302 to stretch or retract. As an example, the support 1302 is an X-shaped support. As another example, the support 1302 is a snowflake-shaped support. For example, the stretchable support rod 1301 and/or the stretchable support 1302 have a nested structure that includes multilayered tubes, where an outmost tube is the thickest and inner tubes are thinner.

Figure 10:
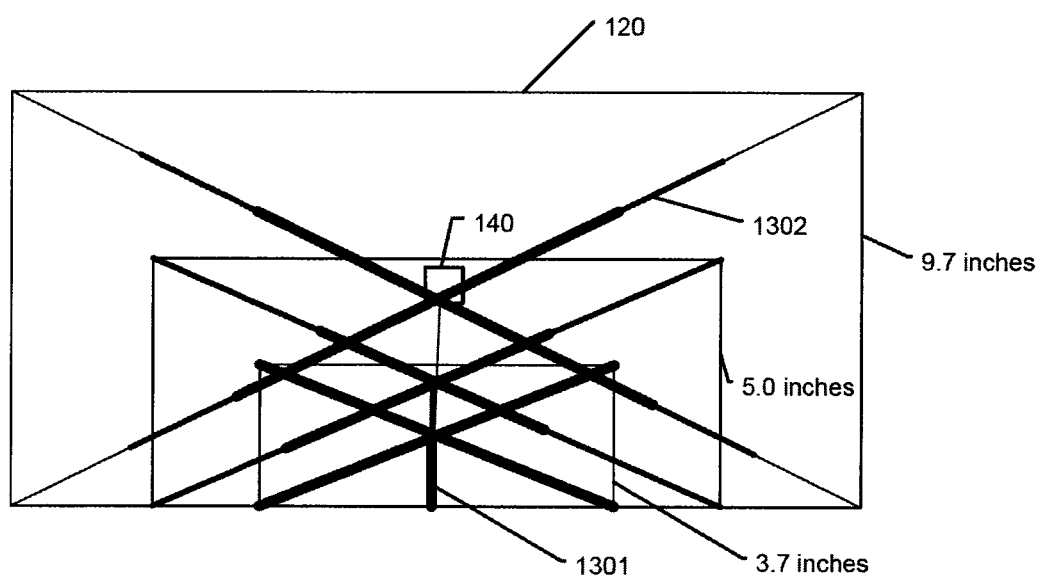
FIG. 10 is a simplified diagram showing the projection frame work as shown in FIG. 9 that stretches or retracts according to one embodiment of the present invention according to one embodiment of the present invention.

FIG. 10 is a simplified diagram showing the projection frame work 130 that stretches or retracts according to one embodiment of the present invention according to one embodiment of the present invention. The diagram is merely an example, which should not unduly limit the scope of the claims. One of ordinary skill in the art would recognize many variations, alternatives, and modifications.

As shown in FIG. 10, initially, the elastic projection screen 120 corresponds to a 3.7-inch projection screen, in some embodiments. For example, if the sliding block 140 is moved upward, the support rod 1301 stretches upward. As the vertex of the support rod 1301 is connected with the central point of the support 1302, the upward stretching of support rod 1301 causes the four sides of the support 1302 to stretch and in turn causes the elastic projection screen 120 to expand. As an example, if the support rod 1301 is held (e.g., fixed) at a 5.0-inch position, the support 1302 does not stretch and the elastic projection screen 120 is expanded to a size of 5.0 inches. For example, when the sliding block 140 continues to slide upward, the support rod 1301 also stretches further upward and the support 1302 is also further stretched. When the support rod 1301 is held (e.g., fixed) at a 9.7-inch position, the support 1302 does not stretch and the elastic projection screen 120 is expanded to a size of 9.7 inches.

As discussed above, and further emphasized here, FIG. 10 is merely an example, which should not unduly limit the scope of the claims. One of ordinary skill in the art would recognize many variations, alternatives, and modifications. For example, the elastic projection screen 120 can be expanded to various different sizes.

Figure 11:
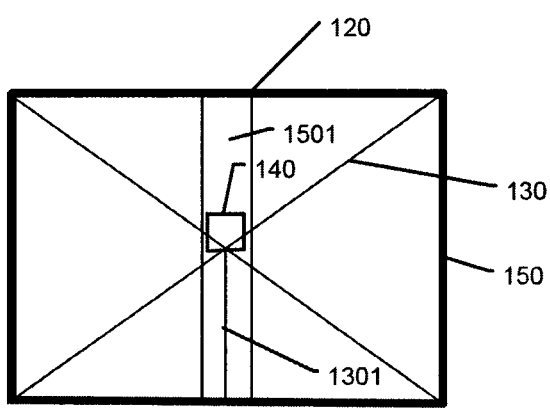
FIG. 11 is a simplified diagram showing a micro-projection-display device according to yet another embodiment of the present invention.

FIG. 11 is a simplified diagram showing a micro-projection-display device according to yet another embodiment of the present invention. The diagram is merely an example, which should not unduly limit the scope of the claims. One of ordinary skill in the art would recognize many variations, alternatives, and modifications. The micro-projection-display device 300 includes an elastic projection screen 120, a stretchable projection framework 130, a sliding block 140, and a housing cover 150.

According to one embodiment, a central part of one side of the elastic projection screen 120 is attached (e.g., fixed) at one end of the housing cover 150. For example, the affixed portion of the elastic projection screen 120 can be on a bottom side, a top side, a left side or a right side of the elastic projection screen 120. As an example, a sliding groove 1501 is disposed on the housing cover 150. The support rod 1301 is disposed in the sliding groove 1501. The sliding block 140 slides inside the sliding groove 1501. In one example, the sliding block 140 is disposed on the outer side of the housing cover 150. When the size of the elastic projection screen 120 needs to be adjusted, a user can move the sliding block 140 manually, and the movement of the sliding block 140 causes the elastic projection screen 120 to expand, in some embodiments.

Figure 12:
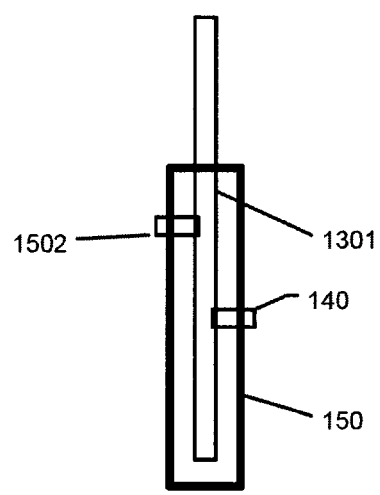
FIG. 12 is a simplified diagram showing a side view of a housing cover as part of the micro-projection-display device as shown in FIG. 11 according to one embodiment of the present invention.

FIG. 12 is a simplified diagram showing a side view of the housing cover 150 as part of the micro-projection-display device 300 according to one embodiment of the present invention. The diagram is merely an example, which should not unduly limit the scope of the claims. One of ordinary skill in the art would recognize many variations, alternatives, and modifications. According to one embodiment, a fixing block 1502 is disposed inside the sliding groove of the housing cover 150, and is used for holding (e.g., fixing) the support rod 1301 in place after the support rod 1301 is moved. For example, the fixing block 1502 includes a clamp, a fixing buckle or a fixing ring.

The adjustable display screen 200 can be combined with an electronic device, such as a mobile phone and a gaming console, to form a micro-projection-display device (e.g., the micro-projection-display device 100 or the micro-projection-display device 300), in some embodiments.

According to one embodiment, a micro-projection-display device includes: a projection lens, an elastic projection screen, a stretchable projection framework and a sliding block. At least one point of the stretchable projection framework is connected with the elastic projection screen, so that the stretchable projection framework is configured to control the elastic projection screen to stretch or retract. The sliding block is connected with the stretchable projection framework. The sliding block is configured to cause the stretchable projection framework to stretch or retract, so as to cause the elastic projection screen to stretch or retract. The projection lens is configured to project light onto the stretched elastic projection screen. For example, the micro-projection-display device is implemented according to at least FIG. 1 and/or FIG. 11.

According to another embodiment, an adjustable display screen includes: an elastic projection screen, a stretchable projection framework, and a sliding block. At least one point of the stretchable projection framework is connected with the elastic projection screen, so that the stretchable projection framework is configured to control the elastic projection screen to stretch or retract. The sliding block is connected with the stretchable projection framework. The sliding block is configured to cause the stretchable projection framework to stretch or retract, so as to cause the elastic projection screen to stretch or retract. For example, the display screen is implemented according to at least FIG. 8.

The above only describes several scenarios presented by the invention, and the description is relatively specific and detailed, yet it cannot therefore be understood as limiting the scope of the invention's patent. It should be noted that ordinary technicians in the field may also, without deviating from the invention's conceptual premises, make a number of variations and modifications, which are all within the scope of the invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

While the specification contains many specifics, these should not be construed as limitations on the scope or of what may be claimed, but rather as descriptions of features specific to particular embodiments. Certain features that are described in the specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, they should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:
1. A micro-projection-display device comprising:
a projection lens;
an elastic projection screen;
a stretchable projection framework; and
a sliding block;
wherein:
    at least one point of the stretchable projection framework is connected with the elastic projection screen, so that the stretchable projection framework is configured to control the elastic projection screen to stretch or retract;
    the sliding block is connected with the stretchable projection framework;
    the sliding block is configured to cause the stretchable projection framework to stretch or retract, so as to cause the elastic projection screen to stretch or retract; and
    the projection lens is configured to project light onto the stretched elastic projection screen.

2. The device of claim 1, wherein the projection framework includes:
a stretchable support rod; and
a stretchable centrosymmetric support;
wherein:
    a vertex of the support rod is connected with a central point of the centrosymmetric support;
    the sliding block is connected on the stretchable support rod; and
    the sliding block is configured to cause the support rod to stretch or retract, so as to cause the stretchable centrosymmetric support to stretch or retract.

3. The device of claim 2, further comprising:
a housing cover,
wherein a central part of one side of the elastic projection screen is attached at an end of the housing cover.

4. The device of claim 3, further comprising:
an electronic body;
wherein the housing cover is disposed on the electronic body.

5. The device of claim 4, wherein a housing groove is disposed on an edge of the electronic body and configured to house the projection lens.

6. The device of claim 1, wherein a projection distance associated with the projection lens is in a range of 5 cm to 15 cm.

7. The device of claim 1, further comprising:
a glass screen used for a non-projection display of the micro-projection-display device.

8. The device of claim 1, wherein the elastic projection screen includes a front surface and a back surface,
the front surface being configured to display to a user a projected image carried by the light projected by the projected lens,
at least a portion of the stretchable projection framework being disposed on the same side as the back surface so as to support the elastic projection screen without obscuring the projected image.

9. A micro-projection-display device comprising:
a projection lens;
an elastic projection screen;
a stretchable projection framework, wherein the stretchable projection framework includes:
a stretchable support rod; and
a stretchable centrosymmetric support;
a sliding block; and
a housing cover,
wherein:
a central part of one side of the elastic projection screen is attached at an end of the housing cover;
at least one point of the stretchable projection framework is connected with the elastic projection screen, so that the stretchable projection framework is configured to control the elastic projection screen to stretch or retract;
the sliding block is connected with the stretchable projection framework;
the sliding block is configured to cause the stretchable projection framework to stretch or retract, so as to cause the elastic projection screen to stretch or retract;
the projection lens is configured to project light onto the stretched elastic projection screen;
a vertex of the support rod is connected with a central point of the centrosymmetric support;
the sliding block is connected on the stretchable support rod;
the sliding block is configured to cause the support rod to stretch or retract, so as to cause the stretchable centrosymmetric support to stretch or retract;
a sliding groove is disposed on the housing cover; and
the support rod is disposed in the sliding groove.

10. The device of claim 9, wherein a fixing block is disposed in the sliding groove and configured to keep the support rod in place after the support rod is moved.

11. A micro-projection-display device comprising:
a projection lens;
an elastic projection screen;
a stretchable projection framework, wherein the stretchable projection framework includes:
a stretchable support rod; and
a stretchable centrosymmetric support, wherein the stretchable centrosymmetric support includes an X-shaped support or a snowflake-shaped support; and
a sliding block;
wherein:
a vertex of the support rod is connected with a central point of the centrosymmetric support;
the sliding block is connected on the stretchable support rod;
the sliding block is configured to cause the support rod to stretch or retract, so as to cause the stretchable centrosymmetric support to stretch or retract;
at least one point of the stretchable projection framework is connected with the elastic projection screen, so that the stretchable projection framework is configured to control the elastic projection screen to stretch or retract;
the sliding block is connected with the stretchable projection framework;
the sliding block is configured to cause the stretchable projection framework to stretch or retract, so as to cause the elastic projection screen to stretch or retract; and
the projection lens is configured to project light onto the stretched elastic projection screen.

12. An adjustable display screen comprising:
an elastic projection screen;
a stretchable projection framework; and
a sliding block;
wherein:
at least one point of the stretchable projection framework is connected with the elastic projection screen, so that the stretchable projection framework is configured to control the elastic projection screen to stretch or retract;
the sliding block is connected with the stretchable projection framework; and
the sliding block is configured to cause the stretchable projection framework to stretch or retract, so as to cause the elastic projection screen to stretch or retract.

13. The screen of claim 12, wherein the projection framework includes:
a stretchable support rod; and
a stretchable centrosymmetric support;
wherein:
a vertex of the support rod is connected with a central point of the centrosymmetric support;
the sliding block is connected on the stretchable support rod; and
the sliding block is configured to cause the support rod to stretch or retract, so as to cause the stretchable centrosymmetric support to stretch or retract.

14. The screen of claim 13, further comprising:
a housing cover,
wherein a central part of one side of the elastic projection screen is attached at an end of the housing cover.

15. The screen of claim 13, wherein the centrosymmetric support includes an X-shaped support or a snowflake-shaped support.

16. The screen of claim 12, wherein the elastic projection screen includes a front surface and a back surface,
the front surface being configured to display a projected image to a user,
at least a portion of the stretchable projection framework being disposed on the same side as the back surface so as to support the elastic projection screen without obscuring the projected image.

17. An adjustable display screen comprising:
an elastic projection screen;
a stretchable projection framework, wherein the stretchable projection framework includes:
a stretchable support rod; and
a stretchable centrosymmetric support;
a sliding block; and
a housing cover, wherein:
- a central part of one side of the elastic projection screen is attached at an end of the housing cover;
- at least one point of the stretchable projection framework is connected with the elastic projection screen, so that the stretchable projection framework is configured to control the elastic projection screen to stretch or retract;
- the sliding block is connected with the stretchable projection framework;
- the sliding block is configured to cause the stretchable projection framework to stretch or retract, so as to cause the elastic projection screen to stretch or retract;
- a vertex of the support rod is connected with a central point of the centrosymmetric support;
- the sliding block is connected on the stretchable support rod;
- the sliding block is configured to cause the support rod to stretch or retract, so as to cause the stretchable centrosymmetric support to stretch or retract;
- a sliding groove is disposed on the housing cover; and
- the support rod is disposed in the sliding groove.

18. The screen of claim 17, wherein a fixing block is disposed in the sliding groove and configured to keep the support rod in place after the support rod is moved.

* * * * *